United States Patent
Patterson

(10) Patent No.: US 10,855,981 B2
(45) Date of Patent: Dec. 1, 2020

(54) TESTING MODULE FOR FIXED FOCUS CAMERA MODULE EVALUATION

(71) Applicant: TRW AUTOMOTIVE U.S. LLC, Livonia, MI (US)

(72) Inventor: Jeff Patterson, Farmington Hills, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 267 days.

(21) Appl. No.: 16/124,396

(22) Filed: Sep. 7, 2018

(65) Prior Publication Data

US 2020/0084436 A1 Mar. 12, 2020

(51) Int. Cl.
| | |
|---|---|
| *H04N 17/00* | (2006.01) |
| *H04N 5/225* | (2006.01) |
| *G03B 17/55* | (2006.01) |
| *H04N 5/232* | (2006.01) |
| *G02B 27/30* | (2006.01) |
| *G02B 7/02* | (2006.01) |

(52) U.S. Cl.
CPC ............ *H04N 17/002* (2013.01); *G02B 7/028* (2013.01); *G02B 27/30* (2013.01); *G03B 17/55* (2013.01); *H04N 5/2254* (2013.01); *H04N 5/232127* (2018.08)

(58) Field of Classification Search
CPC .. H04N 17/002; H04N 5/2254; H04N 5/2257; H04N 5/232127; G02B 27/30; G02B 7/028; G02B 17/55
See application file for complete search history.

(56) References Cited

U.S. PATENT DOCUMENTS

| | | | | |
|---|---|---|---|---|
| 5,455,715 A | * | 10/1995 | Okubo ................... | G02B 27/30 285/414 |
| 5,461,472 A | * | 10/1995 | Harvey .................. | G01B 11/26 356/138 |
| 2008/0030728 A1 | * | 2/2008 | Nguyen ................ | G01J 3/0262 356/328 |
| 2010/0014081 A1 | * | 1/2010 | Huening ............... | G01J 3/2803 356/328 |
| 2013/0321627 A1 | * | 12/2013 | Turn, Jr. ............. | G06K 9/00805 348/148 |
| 2016/0342076 A1 | * | 11/2016 | Katou .................... | G02B 7/008 |
| 2017/0359556 A1 | * | 12/2017 | Yoshimura ........... | G03B 21/008 |

* cited by examiner

*Primary Examiner* — Francis C Gray

(74) *Attorney, Agent, or Firm* — Tarolli, Sundheim, Covell & Tummino LLP

(57) ABSTRACT

A testing module connectable to a thermal chamber having a wall with an access port for use in evaluating the effects of temperature on a fixed focus camera module. The testing module includes a window housing extending along a central axis between a first and a second end. A passage extends through the housing along the central axis. A window is received in the passage. A collimator mount is secured to the first end of the window housing. The collimator mount is adapted to attach a collimator to the window housing. A camera mount is secured to the second end of the window housing. The camera mount is adapted to attach the fixed focus camera module to the window housing.

12 Claims, 5 Drawing Sheets

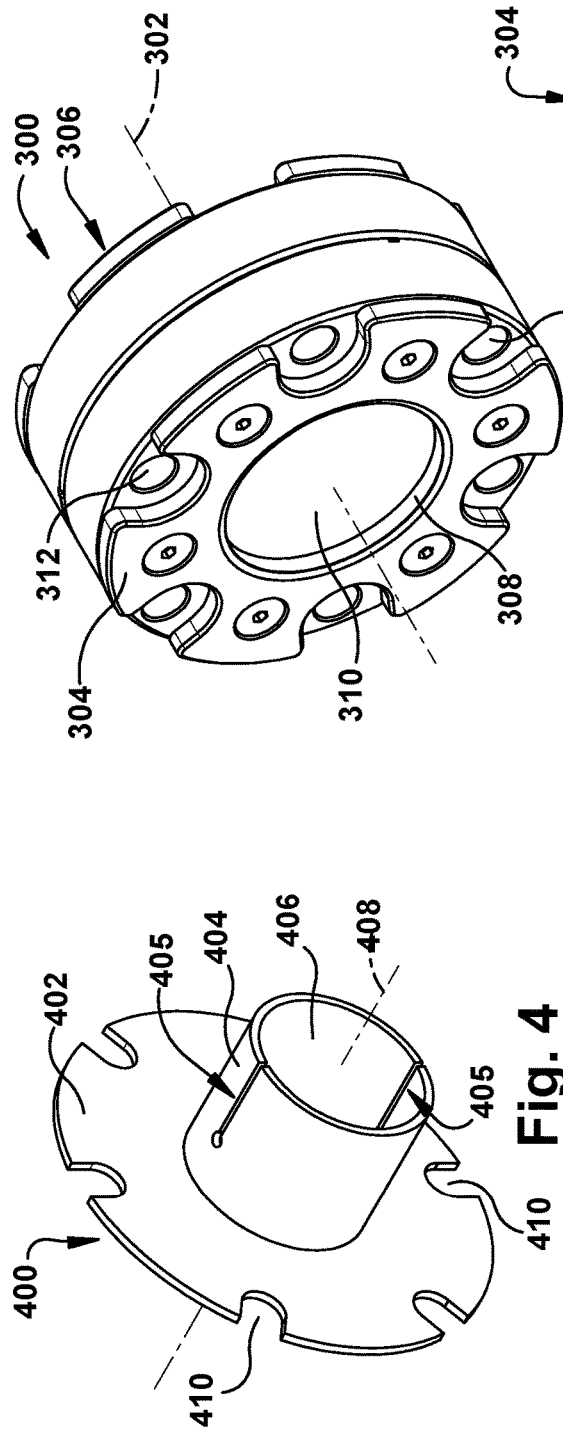
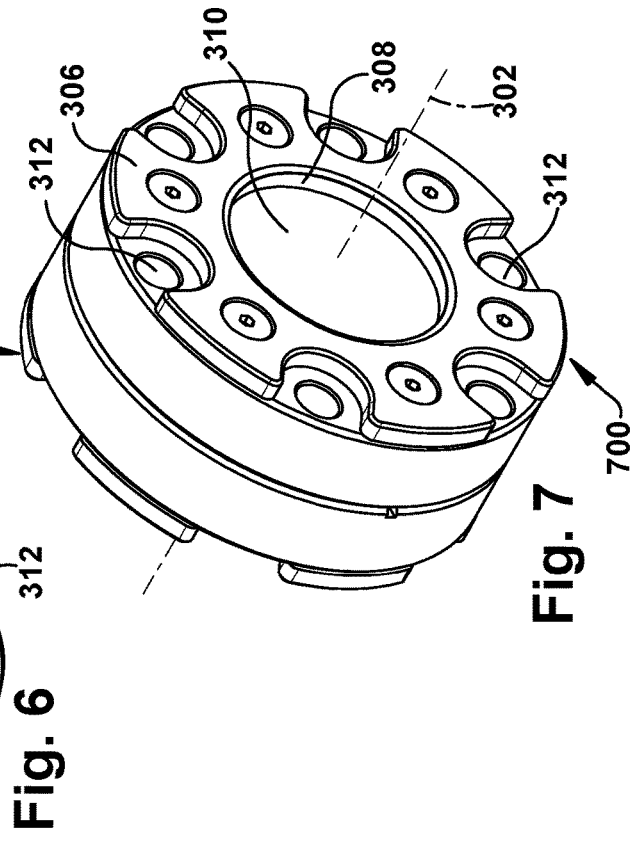
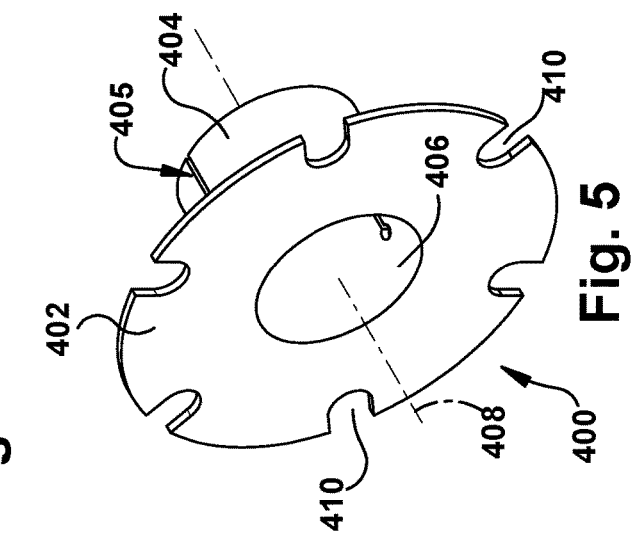

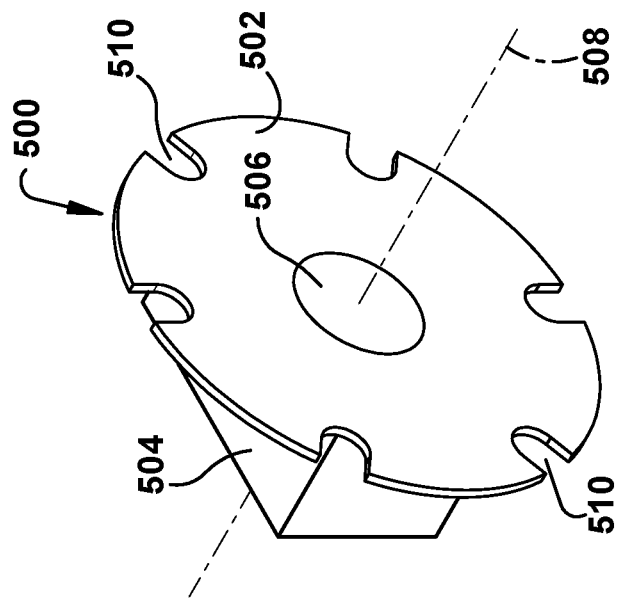
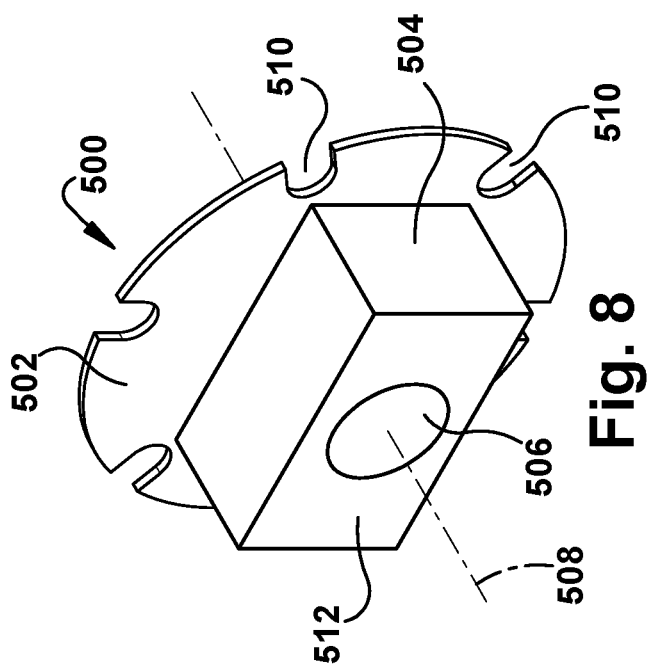

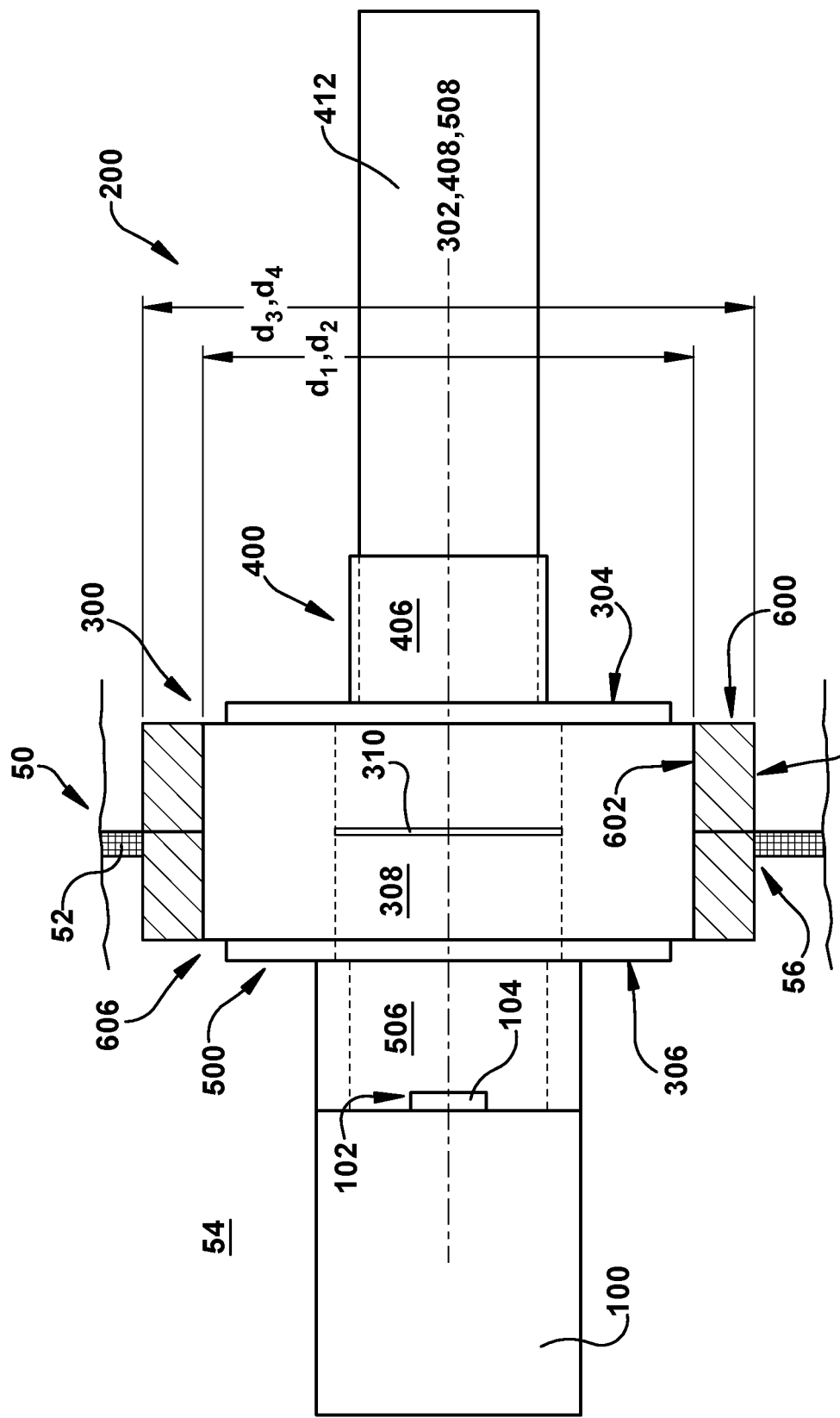

TESTING MODULE FOR FIXED FOCUS CAMERA MODULE EVALUATION

FIELD OF THE INVENTION

The present invention relates to a fixed focus camera module and, in particular, to a testing module for use in thermal evaluation of a fixed focus camera module.

BACKGROUND TO THE INVENTION

A fixed focus camera module is an apparatus where both a lens and an imager of a camera are fixed in place such that the lens does not move, zoom, or otherwise change a location of an image plane. One example use for a fixed focus camera module is in a driver assist system (DAS). The fixed focus camera can be attached to a vehicle to give the DAS visual data of an area outside the vehicle. The DAS monitors the environment surrounding the vehicle and provides other vehicle systems with information relating to the surrounding environment to aid in operation of the vehicle. The DAS can, for example, monitor for a potential vehicle collision condition, a lane or roadway departure occurrence, road sign information, pedestrian information, and/or traffic information.

Typically, an output of the fixed focus camera module is analysed by an image processing module. The controller uses the raw video output of the fixed focus camera module and provides an onboard computer of the vehicle with information that can be used to interact with other vehicle system. The onboard computer can then provide a vehicle operator with warnings, haptic tactile feedback, and/or autonomous vehicle control contingent on feedback from the image processing module.

Ambient temperature can cause various components of the fixed focus camera module to expand or contract. This expansion or contraction can ultimately cause the fixed focus camera module to become out of focus and undesirably compromise the camera output. Therefore, it is known to evaluate the focus of a fixed focus camera module over a specified operational temperature range. One known arrangement for evaluating the focus of a fixed focus camera module over a specified operational temperature range is schematically shown in FIG. 1. This arrangement includes a specialized thermal chamber 20. The thermal chamber 20 is includes at least one wall 22 manufactured out of application specific glass. A fixed focus camera module 24 is placed in an interior space 26 of the thermal chamber 20. A camera 28 of the fixed focus camera module 24 looks through the glass wall 22 and at test equipment 30 used to measure focus of the camera 28. The test equipment 30 is located outside the thermal chamber 20.

While this arrangement can be used to satisfactorily evaluate the effects of temperature on focus of the fixed focus camera module 24 camera 28, it is not without drawbacks. For example, the thermal chamber 20 can be very expensive to manufacture. As another example, the dimensions of the thermal chamber 20 can be considerably larger than the dimensions of the fixed focus camera module 24. Although the fixed focus camera module 24 is the only component that needs to be at a desired test temperature, the entire thermal chamber 20 (which may be 30"×30"×30") must be at the desired test temperature for accurate evaluation. Heating or cooling of the entire thermal chamber 20 can take considerable time, which impedes the evaluation process.

Standardized thermal chambers are known. Standardized thermal chambers can be considerably cheaper to manufacture than the aforementioned specialized thermal chambers. Furthermore, the standardized thermal chambers are readily available in sizes that more closely approximate the dimensions of a fixed focus camera module (e.g., 5"×5"×5"). However, no arrangement currently exists for adapting these standardized thermal chambers for use in fixed focus camera module testing.

SUMMARY OF THE INVENTION

According to one aspect of the invention, a testing module is connectable to a thermal chamber having a wall with an access port for use in evaluating the effects of temperature on a fixed focus camera module. The testing module includes a window housing extending along a central axis between a first and a second end. A passage extends through the housing along the central axis. A window is received in the passage. A collimator mount is secured to the first end of the window housing. The collimator mount is adapted to attach a collimator to the window housing. A camera mount is secured to the second end of the window housing. The camera mount is adapted to attach the fixed focus camera module system to the window housing.

BRIEF DESCRIPTION OF THE DRAWINGS

Embodiments of the invention will now be described by way of example only, with reference to the accompanying drawings, in which:

FIG. 4 is a perspective view of a collimator mount that makes up part of the testing module of FIG. 2;

FIG. 5 is another perspective view of the collimator mount of FIG. 4;

FIG. 6 is a perspective view of a window housing that makes up part of the testing module of FIG. 2;

FIG. 7 is another perspective view of the window housing of FIG. 6;

FIG. 8 is a perspective view of a camera mount that makes up part of the testing module of FIG. 2;

FIG. 9 is another perspective view of the camera mount of FIG. 8; and

FIG. 10 is a sectional view of the testing module of FIG. 2 installed in an access port of a thermal chamber.

DETAILED DESCRIPTION

Figure 1:
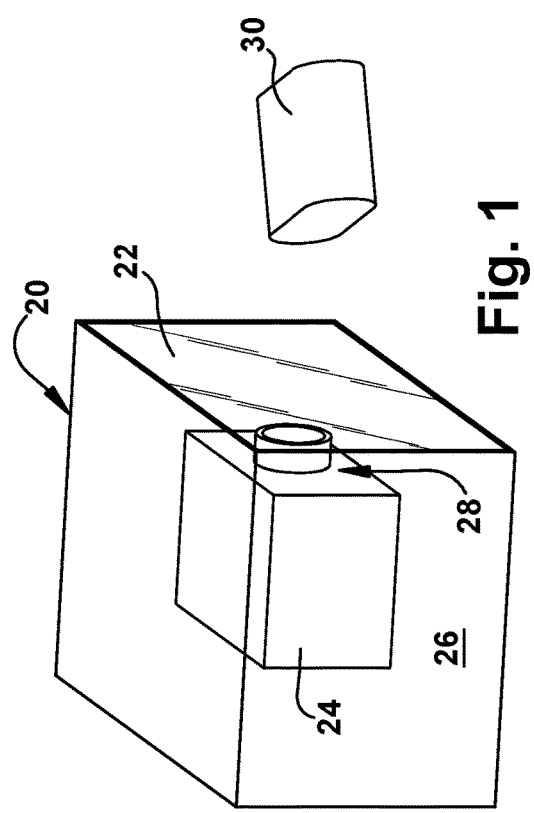
FIG. 1 is a schematic view of a prior art arrangement evaluating the focus of a fixed focus camera module over a specified operational temperature range.
Figure 2:
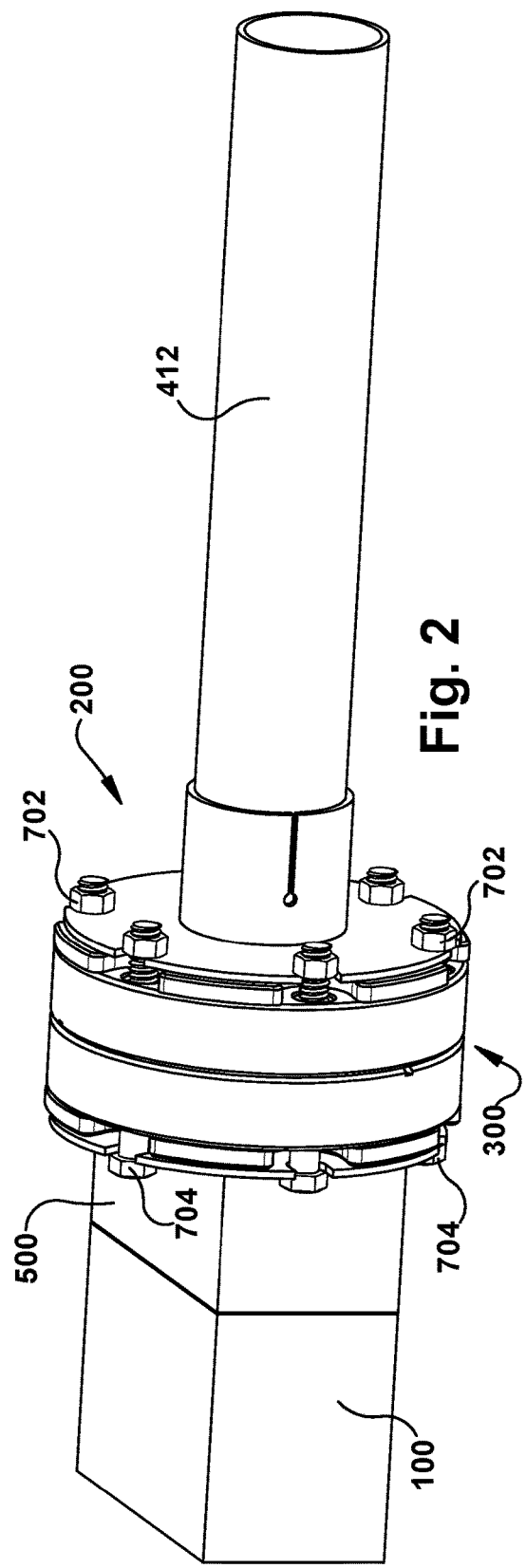
FIG. 2 is a perspective view of a testing module of the present invention and a fixed focus camera module attached to the testing module.

A testing module 200 (FIGS. 2 and 3) is connectable to a standardized thermal chamber 50 (FIG. 10) for use in evaluating the effects of temperature on a camera 102 of a fixed focus camera module 100. In one example, the thermal chamber 50 (FIG. 10) has a plurality of walls 52 that are arranged to form a cuboid shape and define an interior space 54. At least one port 56 is provided on one of the plurality of walls 52. Generally, the port 56 is provided to allow cabling and other wires (not shown) to pass through the thermal chamber 50 wall 52.

Figure 3:
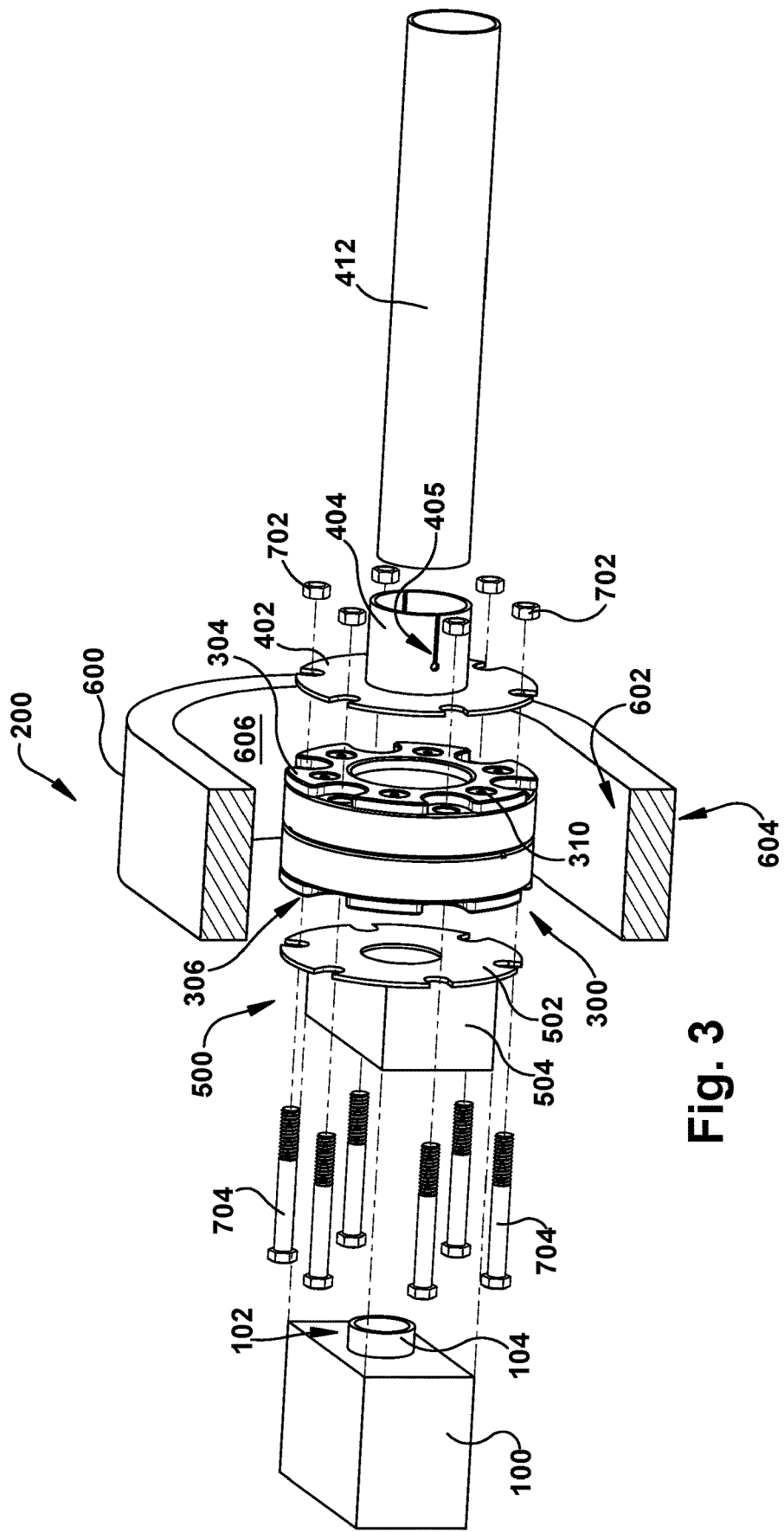
FIG. 3 is an exploded view of FIG. 2.

The testing module 200 includes a window housing 300 (FIGS. 3, 6, and 7). The window housing 300 extends along a central axis 302 between a first end 304 and a second end 306. A passage 308 extends through the window housing 300 along the central axis 302. A window 310 is received in the passage 308 between the first end 302 and the second end 304. It is contemplated that more than one window can be provided in the passage between the first end 302 and the second end 304. In one example, the window 310 is double-paned. The space between the panes can be filled with an inert gas. However, the window 310 can be any desired construction. The window 310 can be provided with an antireflective coating and a hydrophobic coating. The antireflective coating prevents the creation of glare on the window 310 and the hydrophobic coating prevents the window 310 from fogging. However, the window 310 can be provided with any other desired coating or be free from any coating. The window housing 300 includes a plurality of fastener apertures 312 that are disposed radially outward of the window 310. Each of the fastener apertures 312 extends through the window housing 300.

A collimator mount 400 (FIGS. 3-5) is secured to the first end 304 of the window housing 300. The collimator mount 400 includes a flange 402 that engages the first end 304. A collimator receiving portion 404 extends from the flange 402 away from the first end 304. A pair of slots 405 extend along a longitudinal extent of the collimator receiving portion 404. In one example, the collimator receiving portion 404 includes two slots 405. However, it is contemplated that the collimator receiving portion 404 can include any desired number of slots 405. A passage 406 extends along a central axis 408 of the collimator mount 400 through the collimator receiving portion 404 and the flange 402.

A collimator 412 is received in the passage 406. The provision of the slots 405 on the collimator receiving portion 404 allows the collimator receiving portion 404 to expand to receive the collimator 412 and securely retain the collimator 412 in the passage 406. The collimator 412 presents a target that is used to measure the focus of the camera 102 during thermal evaluation of the fixed focus camera module 100. In one example, the collimator 412 is of the fixed-focus type and configured to evaluate on-axis focus of the fixed focus camera module 100 camera 102. However, it is contemplated that the collimator 412 can be of any desired type (e.g., focusing collimator) and configured to measure any desired performance metric of the fixed focus camera module 100. A plurality of cutouts 410 are provided radially outward of the collimator receiving portion 404 along a periphery of the flange 402.

A camera mount 500 (FIGS. 3, 7, and 8) is secured to the second end 306 of the window housing 300. The camera mount 500 includes a flange 502 that engages the second end 306. A camera receiving portion 504 extends from the flange 502 away from the second end 306. A passage 506 extends along a central axis 508 of the camera mount 500 through the camera receiving portion 504 and the flange 502. An end face 512 of the camera receiving portion 504 is configured to act as a seat for the fixed focus camera module 100 for affixing the fixed focus camera module 100 to the camera mount 500. In one example, mechanical fasters (not shown), such as nuts and bolts, affix the fixed focus camera module 100 to the camera mount 500. However, any desired fastening arrangement can be used. A camera lens 104 of the fixed focus camera module 100 camera 102 is received in the passage 506 when the fixed focus camera module 100 is affixed to the camera mount 500. A plurality of cutouts 510 are provided radially outward of the camera receiving portion 504 along a periphery of the flange 502. The camera mount 500 is customizable to allow for the attachment of any desired fixed focus camera module to the window housing 300.

A plurality of fasteners 602, 604 secure the window housing 300, the collimator mount 400, and the camera mount 500 to one another. In one example, the plurality of fasteners 602, 604 are provided as nuts 602 and bolts 604. However, any desired fasteners can be used. Each bolt 604 is received in a respective one of the cutouts 510 on the flange 502 of the camera mount 500, the fastener apertures 312 on the window housing 300, and the cutouts 410 on the flange 402 of the collimator mount 400. Each nut 602 is threaded onto a respective one of the bolts 604. The nut 602 and bolt 604 assemblies cooperate to clamp the window housing 300 between the collimator mount 400 and the camera mount 500. When assembled, the central axis 408 of the collimator mount 400 is aligned with the central axis 302 of the window housing 300, which in turn is aligned with the central axis 508 of the camera mount 500. Consequently, the passages 406, 308, 506 of the collimator mount 400, the window housing 300, and the camera mount 500, respectively, are aligned with one another. Thus, when the fixed focus camera module 100 is affixed to the camera mount 500, the camera lens 104 looks through the passage 506 of the camera mount 500, the window 310 of the window housing 300, and at the target presented by the collimator 412.

The testing module 200 includes a sealing plug 600 (FIGS. 3 and 10) made out of a compressible, resilient material. In one example, the sealing plug 600 is shaped as a hollow cylinder. However, the sealing plug 600 can be any desired shape. The sealing plug 600 has a first wall 602 and a second wall 604 spaced radially outward of the first wall 602. The first wall 602 defines a receiving space 606 and has a diameter $d_1$ that substantially corresponds to a diameter $d_2$ of the window housing 300 such that a seal is formed between the window housing 300 and the first wall 602 of the sealing plug 600. A diameter $d_3$ of the second wall 604 substantially corresponds to a diameter $d_4$ of the port 56.

An example use of the testing module 200 will now be explained. First, the collimator mount 400 and the camera mount 500 are attached to the window housing 300 as described above. Next, the collimator 412 is inserted into the passage 406. Then, the fixed focus camera module 100 is affixed to the end face 512 of the camera receiving portion 504. The assembled collimator mount 400, window housing 300, and camera mount 500 are then positioned in the receiving space 606 of the sealing plug 600. This assembly is then loaded into the port 56 of the thermal chamber 50 with the fixed focus camera module 100 located in the interior space 54 and the collimator 412 located outside of the thermal chamber 50. The assembly is positioned in the port 56 such that the window 310 of the window housing 300 is substantially aligned with the wall 52 in which the port 56 is located. The compressible, resilient construction of the sealing plug 600 creates a substantial airtight seal between the wall 52 and the testing module 200. The thermal chamber 50 can then be heated or cooled as desired to conduct the tests necessary to test the focus of the fixed focus camera module 100 camera 102 at various temperatures.

The testing module 200 allows for faster and cheaper fixed focus camera module evaluation. The customizable camera mount 500 allows any desired fixed focus camera module to be attached to the window housing 300. Additionally, because the thermal chamber 50 more closely approximates the dimensions of a fixed focus camera module, heating and/or cooling of the thermal chamber 50 can be accomplished more quickly. Furthermore, the testing module 200 can eliminate the use of the expensive specialized thermal chambers having a wall manufactured out of application specific glass.

What have been described above are examples of the disclosure. It is, of course, not possible to describe every conceivable combination of components or method for purposes of describing the disclosure, but one of ordinary skill in the art will recognize that many further combinations and permutations of the disclosure are possible. For example, although the window housing 300, collimator mount 400, camera mount 500, and sealing plug 600 are shown as being substantially cylindrical, any one of these components can be provided as any desired shape and arrangement. As another example, although the testing module 200 is described as being used with the sealing plug 600, it is contemplated that the sealing plug 600 can be omitted and the window housing 300, collimator mount 400, and/or camera mount 500 can be dimension and configured to create a substantially airtight seal in the port 56 of the thermal chamber 50 wall 52. Accordingly, the disclosure is intended to embrace all such alterations, modifications, and variations that fall within the scope of this application, including the appended claims.

The invention claimed is:

1. A testing module connectable to a thermal chamber having a wall with an access port for use in evaluating the effects of temperature on a fixed focus camera module, the testing module comprising:
   a window housing extending along a central axis between a first and a second end, a passage extending through the housing along the central axis, a window being received in the passage;
   a collimator mount secured to the first end of the window housing, the collimator mount being adapted to attach a collimator to the window housing; and
   a camera mount secured to the second end of the window housing, the camera mount being adapted to attach the fixed focus camera module to the window housing.

2. The testing module of claim 1, wherein the collimator mount includes a flange, a collimator receiving portion extending from the flange, and a passage extending through the flange and the collimator receiving portion, the flange engaging the first end of the window housing, the collimator being received in the passage.

3. The testing module of claim 1, wherein the collimator is a fixed-focus collimator.

4. The testing module of claim 1, wherein the camera mount includes a flange, a camera receiving portion extending from the flange, and a passage extending through the flange and the camera receiving portion, the flange engaging the second end of the window housing.

5. The testing module of claim 1, wherein an end face of the camera receiving portion is configured to act as a seat for the fixed focus camera module to affix the fixed focus camera module to the camera mount, a camera lens of the fixed focus camera module being received in the passage when the fixed focus camera module is affixed to the camera mount.

6. The testing module of claim 1, wherein the window is a double-paned window, the space between the panes of the window being filled with inert gas.

7. The testing module of claim 6, wherein the window is provided with at least one of an antireflective coating and a hydrophobic coating.

8. The testing module of claim 1, wherein the sealing plug is dimensioned and configured to form a substantially airtight seal between the wall of the standardized thermal chamber and the testing module.

9. The testing module of claim 1 further comprising a sealing plug having a first wall defining a receiving space and a second wall spaced radially outward of the first wall, the window housing, the collimator mount, and the camera mount being located in the receiving space.

10. The testing module of claim 2, wherein the collimator mount includes a slot extending along a longitudinal extent of the collimator receiving portion.

11. The testing module of claim 1, wherein the collimator is a focusing collimator.

12. The testing module of claim 1, wherein the fixed focus camera module is for a driver assist system.

* * * * *